March 27, 1962     L. T. SANDOR     3,027,553
OVERLOAD RESPONSIVE THRUST MECHANISMS
Filed Dec. 14, 1959     2 Sheets-Sheet 1
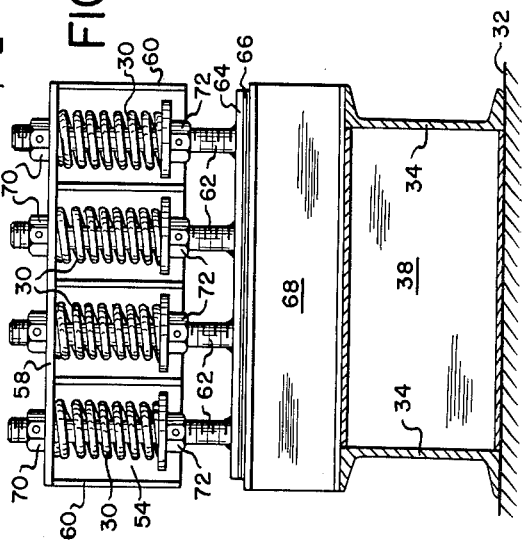
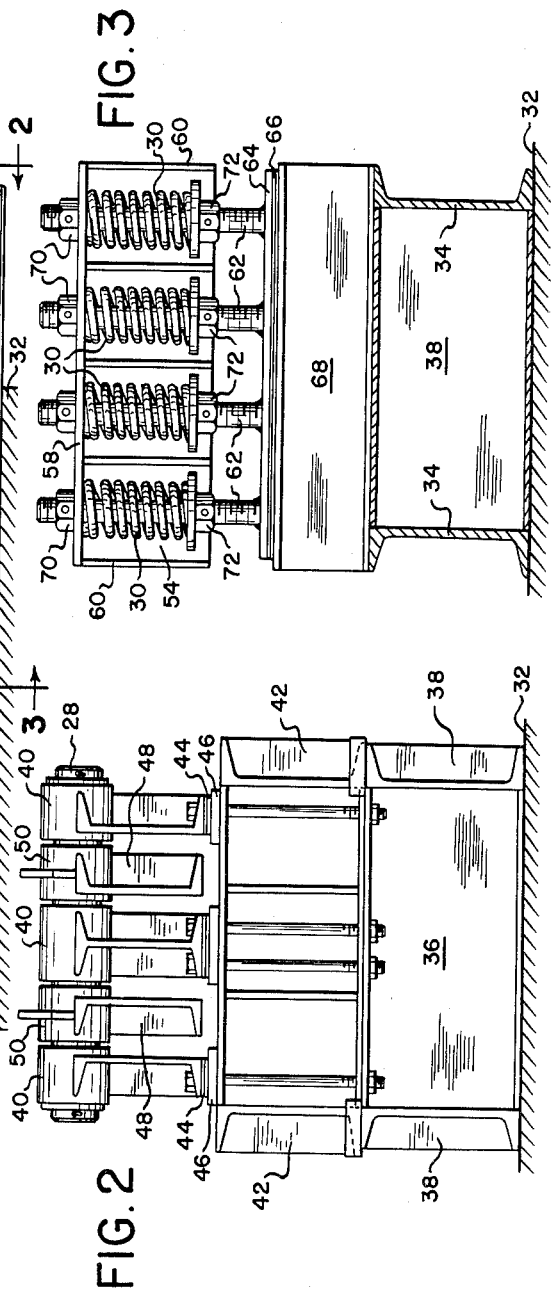
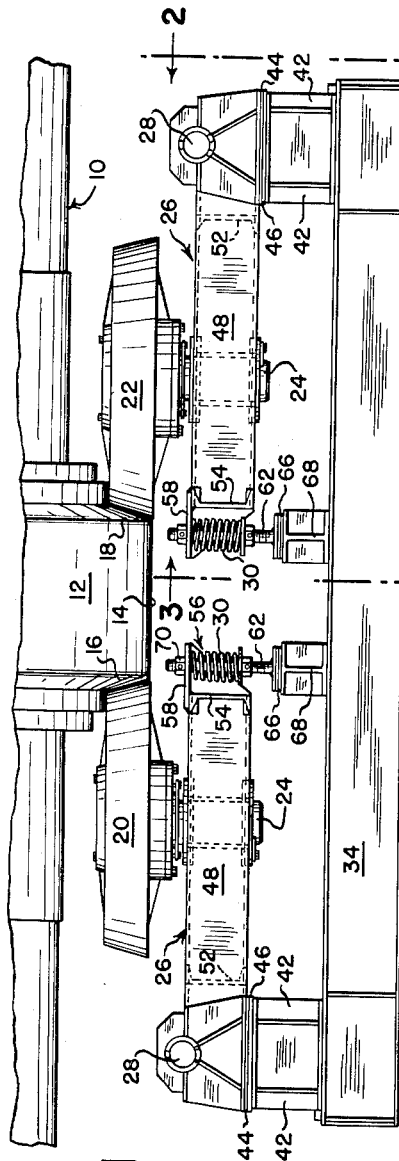
INVENTOR
Leslie T. Sandor
BY
ATTORNEYS

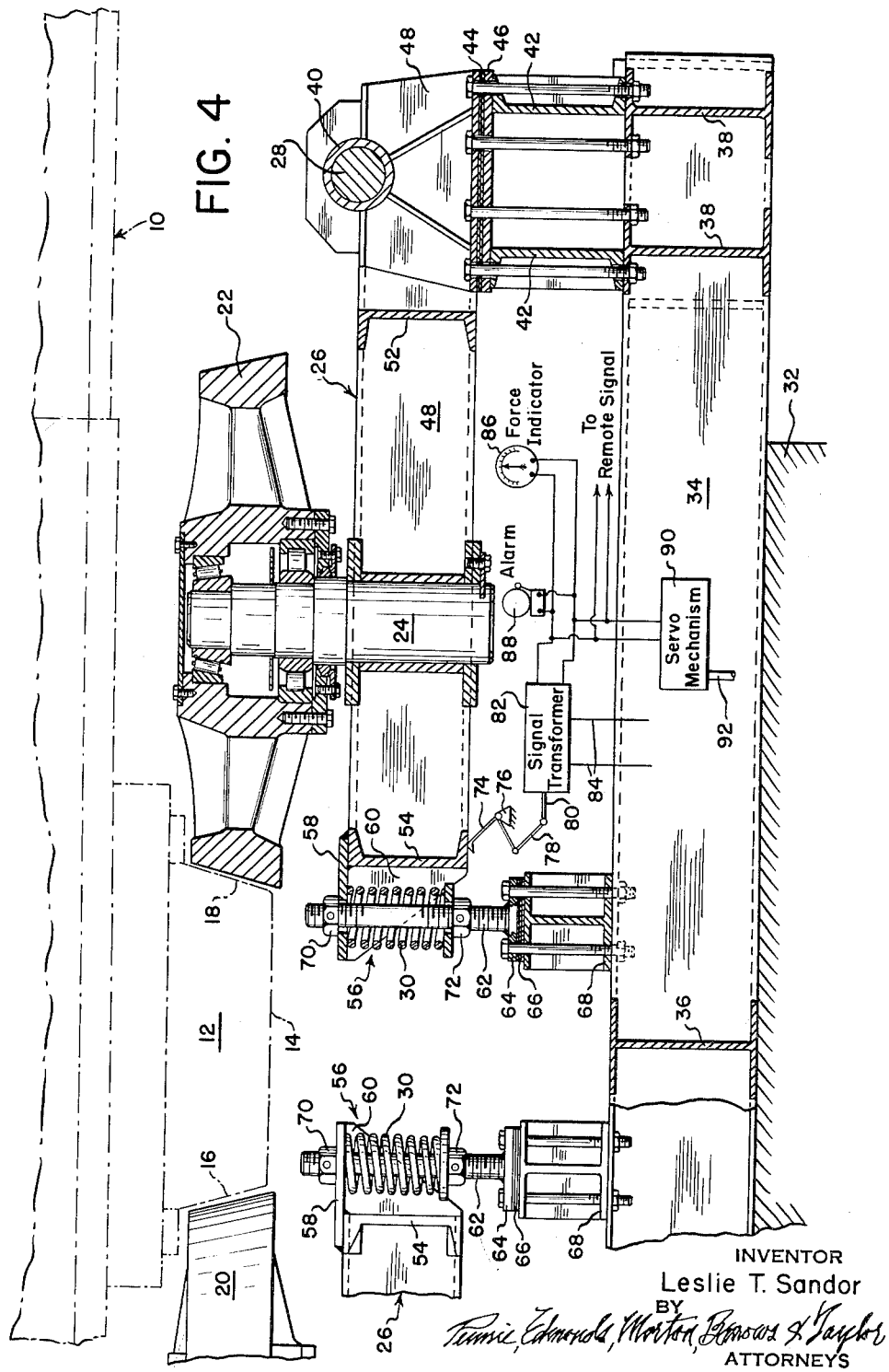

United States Patent Office  3,027,553
Patented Mar. 27, 1962

3,027,553
OVERLOAD RESPONSIVE THRUST MECHANISMS
Leslie T. Sandor, New York, N.Y., assignor to Kennedy Van Saun Mfg. & Eng. Corp., New York, N.Y., a corporation of Delaware
Filed Dec. 14, 1959, Ser. No. 859,298
12 Claims. (Cl. 340—269)

My invention relates to improvements in thrust mechanisms, in thrust roller or bearing mountings and in such thrust mechanisms and mountings responsive to thrust overloads. The invention particularly relates to mechanisms of the type referred to provided especially in heavy machinery or equipment in which thrust roller or rollers are employed to prevent longitudinal shifting, for example in inclined rotary kilns, rotary mills, rotary driers or rotary shafts, each having a thrust load.

Thrust rollers are provided on many rotatable bodies of the type referred to; a rotary cement kiln, for example, is usually provided with external tires which are supported on carrying rollers. Such kilns are also conventionally provided with thrust rollers mounted under the kiln between the carrying rollers on respective sides of at least one of the kiln tires. The kiln tire has a wide flat bearing surface and beveled side walls, and the thrust rollers are provided with beveled rims engaging the beveled side walls of the kiln tire. Such thrust rollers are mounted on a rigid structure and are provided primarily to stop the longitudinal movement of the kiln whenever an uncontrollable downward or upward motion occurs. They are not intended to carry the full thrust of the loaded kiln at all times, since such thrust is largely taken by the carrying rollers which are mounted in a cocked position, so that they will produce a thrust contrary to that produced by the loaded kiln arranged on an incline or slope. The cocking of the carrying rollers tends to push the loaded kiln shell upwards. However, many times the cocking of the carrying rollers in this way results in the surface of the carrying roller and the surface of the tire being out of parallel, so that a point of contact results which is detrimental to the kiln tire and carrying rollers.

The pushing action due to the cocking of the carrying rollers is extremely difficult to control and will vary with the finish of the contacting surfaces as well as the relative hardness and the lubrication conditions between them within the same cocking angle. Sometimes the pushing action will produce an upward push greater than that of the kiln's downward thrust. Thrust rollers are, therefore, provided on both the upper and lower sides of the kiln tire.

One of the principal objects of the invention is to overcome the difficulties previously encountered in the control of the thrust of inclined rotatable bodies such as rotary cement kilns, heavy shafts and other rotatable equipment.

Another important object of the invention is to provide an overload responsive thrust mechanism which will avoid damage to inclined rotatable bodies of large or massive equipment.

A further object of the invention is to provide a thrust roller mounting normally carrying a full thrust load but which is yieldable in response to a thrust overload to an extent to avoid damage to the carrying system and the rotatable body.

An additional object of the invention is to provide an overload responsive thrust mechanism adapted to instantly detect impending possible damage to the kiln and supporting mechanism because of improper mounting, improper lubrication or overloading of the kiln, whereby such conditions may be overcome before any damage is done.

In accordance with my invention an inclined rotatable body such as a rotary cement kiln, having an external tire or equivalent thrust engagement member is provided with at least one thrust roller or rotatable thrust bearing, engaging the tire or equivalent member on its lower side. The body is preferably provided with thrust rollers or thrust bearings on both the upper and lower sides of the tire or equivalent member. In this construction each thrust roller or thrust bearing is provided with a deflectable mounting permitting the thrust roller or bearing to tilt on its axis, or give, in response to a thrust overload. The deflectable mounting for the thrust roller or bearing includes a spring, counterweight, pneumatic or hydraulic means, or other equivalent for absorbing the overload thrust and deflection of the mounting.

In a preferred construction the thrust roller mounting comprises a bridge carrying the thrust roller intermediate its ends, the bridge being pivoted at one end and resiliently supported at the other end by the spring or equivalent means. In this construction the occurrence of a thrust overload causes deflection of the bridge and permits of some give in the mounting system.

Another important feature of the invention is the provision of a signal or an alarm system which may include controls and which is responsive to the deflection of the thrust roller mounting so that the cause of the overload is detected instantly and corrected.

The construction according to the invention includes other features, objects and advantages described more in detail hereinafter in connection with the accompanying drawings forming a part of this application.

In the drawings:

FIG. 1 is an elevational view showing the improved thrust roller mountings according to the invention;

FIG. 2 is an end view of one of the thrust roller mountings taken on the line 2—2 of FIG. 1 and showing the pivot end;

FIG. 3 is an end view partly in section showing the other end of the thrust roller mounting, taken on the line 3—3 of FIG. 1; and FIG. 4 is a broken view partly in vertical section and partly diagrammatic showing the improved overload-responsive thrust mechanism in connection with an inclined rotary cement kiln.

The overload-responsive thrust mechanism in accordance with the present invention is illustrated in the drawings in connection with a rotary cement kiln which is inclined in the usual manner and subjected to the operating problems referred to above. It is to be understood, however, that the invention is applicable to other rotary bodies subject to possible thrust overloads.

Referring to FIG. 1 of the drawings, a portion of the inclined rotary cement kiln is shown at 10 at a location intermediate its ends where it is provided with a kiln tire 12 by which the kiln is supported in the usual way on carrying rollers, not shown. The kiln tire 12 extends entirely around the periphery of the kiln and is provided with a wide cylindrical bearing surface 14 which rests on the carrying rollers. The kiln tire is provided with annular beveled side walls 16 and 18 extending inwardly from the surface 14, respectively on the up and down slope sides of the tire. The carrying rollers are conventional and not shown in the drawings, it being understood that they are located in spaced relation on the respective sides of a vertical line extending through the axis of the kiln, so that the kiln is cradled and rotates on the carrier rollers.

The thrust roller unit of the present invention is located directly under the kiln in line with its axis and comprises thrust rollers 20 and 22 having beveled rims respectively parallel to and engaging the beveled surfaces 16 and 18, the rollers being mounted parallel to the kiln axis on heavy stub shafts 24 set perpendicular to the axis of the kiln. Each of the rollers 20 and 22 are free-rolling wheel-like rollers mounted on the stub shafts 24 by means of spaced upper and lower roller bearing units.

In accordance with the present invention, each of the rollers 20 and 22 is mounted on a bridge 26, one end of which is pivoted on a pivot shaft 28, while the other end is supported on a resilient means, such as a system of springs 30. The supporting structure for the bridges 26 includes a base 32 of concrete or other suitable base material. Directly above this is a pair of spaced steel channel beams 34 connected at the center by an I-beam 36 and at each end by a pair of spaced I-beams 38. The spaced side beams 34 and the I-beams 36 and 38 are welded together to form a rigid structure resting on the base 32 and located parallel to the axis of the kiln.

The pivot shaft 28 for each bridge 26 is mounted in three spaced bearing supports 40 supported by a pair of spaced transverse channel beams 42 resting respectively on the pair of I-beams 38 and bolted thereto and to the beams 34 by bolts as indicated in FIGS. 2 and 4. The bases of each of the bearing supports 40 are set directly on shims 44 carried on steel plates 46. The bottom flanges of the bearing supports 40 are bolted through the shims 44 and the respective plates 46 to the flanges of the cross channel beams 42.

Each of the bridges 26 comprises a pair of parallel spaced channel beams 48 provided with pivot bearings 50 at their outer ends mounted on the pivot shaft 28 in the spaces between the three bearing supports 40. The channel beams 48 are tied together into a rigid structure by cross channel beams 52 and 54. The channel beam 52 is located near the bearing supports 40, while the cross channel beam 54 is located at the opposite end of the channel beams 48. A bracket 56 is fixed to the cross channel beam 54 at the inner end of each bridge 26. Each bracket 56 comprises a top plate 58 welded to the top of the cross beam 54 and the beams 48 and regularly-spaced triangular-shaped webs 60 welded to the bottom of the plate 58 and to the beam 54. Each of the plates 58 is provided with four regularly-spaced holes located respectively between adjacent webs 60 through which heavy stud bolts 62 extend, and around which the compression coil springs 30 are mounted. The lower ends of the stud bolts 62 are welded to a transverse steel plate 64 mounted on shims 66 which in turn are mounted on an I-beam 68, the ends of which rest on the supporting channel beams 34. The I-beams 68 are bolted to the channel beams 34, and each plate 64 and associated shims 66 are bolted to the upper part of the corresponding channel beam 68.

The heavy studs 62 are threaded, as shown, and provided with upper and lower positioning nuts 70 and 72 for respectively adjusting the maximum height of the inner ends of the bridges 26 with respect to the kiln tire 14 and the tension on the coil springs 30 bearing against the plate 68.

The shafts 24 carrying the thrust rollers 22 are each provided with a shoulder, as shown, resting on the transverse shaft mounting carried by the beams 48 of the bridge 26. The nuts 70 and 72 are used to adjust the position of the thrust rollers 22 with respect to the kiln tire 14. When the bridges 26 and thrust rollers 22 are set in place, with the shafts 24 at approximately right angles to the axis of the kiln, the bridges are set so that the bevels of the rollers fit the side bevels 16 and 18 respectively of the kiln tire 14, the adjustments being made by means of the shims 44 and 66. With the thrust rollers set in place as shown in FIG. 1, the pivot shafts 28 carry the full thrust load of the kiln in the respective directions, and the opposite end of the bridges 26 are counterbalanced by the springs 30, or equivalent means, the counterbalance being calculated to carry the full weight of the bridge and thrust roller, applied at the position of the springs 30 and also the proportional amount of the vertical component of the normal kiln thrust, without deflection. The sets of springs 30 are precompressed or preset to the calculated or tested total load.

The vertical component due to the kiln thrust results, at least in a considerable part from the bevel angle of the sides of the kiln tire and rollers, and it will be understood that the vertical load resulting from the vertical component of the thrust will vary with the thrust load of the kiln. When that exceeds the preset safe limit, the load on the set of springs 30 resulting from the vertical component of the thrust will overcome the resistance of the springs and cause the bridge to tip, or pivot on the shaft 28.

The presetting of the bridge of each thrust roller unit can be effected within limits at different heights relative to the fixed sub-base, while the pivot side is shimmed to the desired extent by the shims 44. This adjustability and presettable feature makes it possible to set up the thrust roller units so that their beveled faces will be parallel to the respective beveled sides 16 and 18 of the kiln tire, thereby eliminating any effects which may be caused by the kiln tire plane not being fully perpendicular to the center line of the kiln. Furthermore, the means for adjusting and presetting the thrust roller units also permits the adjustment of the height of the thrust rollers, as made necessary because of the wear of the carrying rollers and kiln tire, and for any other reason. The fact that each thrust roller can be set up individually, so that its engagement face is perfectly parallel with the beveled side of the tire assures full face contact under normal conditions, resulting in reduced wear on both rollers and kiln tire. It also eliminates the possibility of load concentration at the lower edge of the roller resulting in selection and use of smaller bearings than normal for the thrust rollers.

The tipping of the bridge 26 when the thrust load of the kiln exceeds the preset safe limit, provides some give in the system so that wedging is avoided. Furthermore, it is impossible for sliding to occur between a thrust roller and kiln tire. These two members rotate relative to each other and the downward tipping of the bridge on the occurrence of an excess thrust load together with the rolling motion results in a relative helical motion of the roller and tire.

In addition to the foregoing features and results achieved from the pivoted preset thrust roller bridges, the tipping response of the bridge to a thrust overload is utilized to actuate a signal means or warning system for evincing or manifesting the overload so that the cause of the thrust overload can be detected and corrected immediately. This is illustrated in connection with the bridge carrying the thrust roller 22 in FIG. 4, in which is shown a bell crank lever 74 pivotally mounted on a fixed support 76 with its upper arm bearing against the underside of the cross beam 54 at the inner end of the bridge. The lower end of the bell crank 74 is connected through a link 78 with a spring biased switch arm 80 extending into a control box 82 housing a switch for connecting electric current supply leads 84 with a transformer in the housing 82. Upon the occurrence of a thrust overload on the roller 22, the preset resistance of the set of springs 30 is overcome and the bridge tilts down accuating the bell crank 74 and the switch arm 80 to supply current through the switch to the transformer to other control and signal elements. Current delivered by the transformer is supplied to actuate a force indicator 86, and particularly an alarm 88 such as a bell or other alarm means. Current may also be sent to a remote signal means as indicated and also to a servo mechanism 90 having an output 92 for use in correcting the thrust overload of the kiln.

It will be understood that the signal system responsive to the thrust overload and tipping of one of the bridges 26 may be varied to a considerable extent in accordance with the particular installation. For example, the bell crank 74 or other lever actuated by the tilting of a bridge 26 may be used directly to close an electric switch for operating the signal, such as the signal 88. While the signal or alarm system is illustrated in connection with only one of the bridges 26, it will be understood that both bridges are provided with the overload responsive alarm means which will be connected into the control panel for the kiln by the remote signal lines as indicated. The alarm or alarms 88 may be located at a suitable location where the kiln operator will know immediately that an excessive thrust is developing, and its direction. The apparatus as described provides a system in which a thrust overload on either thrust roller will be detected instantaneously so that the cause of the overload, such as improper mounting, inadequate lubrication or kiln overloading can be corrected before any serious damage to the kiln occurs.

While the invention has been illustrated and described in connection with its use with inclined rotary cement kilns, it is to be understood that it may be used in any other equipment of the type referred to above whether or not one or more thrust rollers are employed. It is also to be understood that the mounting for the thrust roller may be arranged according to the rotatable member with which it is associated and the direction of thrust involved. With heavy equipment, such as described, a heavy truss type bridge for the thrust roller is used advantageously, but the roller may be mounted on a pivoted support arranged so that one end of the support is pivoted, while the other end is mounted in an adjustable manner on a resilient means, preset to withstand the critical or normal load without deflection, and to deflect upon the occurrence of an overload. The rolling faces of the roller and contacted bearing ring or shoulder may be beveled in the manner described in connection with the cement kiln so as to produce a force component at an angle to the axis of the kiln, but the force component may be transmitted to the pivotally-mounted thrust roller in other ways depending on the rotatable member subject to thrust. Under certain circumstances the pivot of the thrust roller may be located adjacent the position of the thrust bearing or ring.

What I claim is:

1. An overload-responsive thrust mechanism for a rotatable member subject to longitudinal thrust loads and thrust overloads, comprising a thrust roller mounted adjacent the rotatable member, the rotatable member having a thrust bearing surface on which the thrust roller rolls when the rotatable member is rotated, means for mounting the thrust roller including a support pivoted at one end and extending generally parallel to the axis of rotation of the rotatable member, and resilient means at the other end of the support for holding the other end of the support and roller in their normal positions without deflection under the normal thrust load of the rotatable member, said resilient means being adapted to permit pivoting of the support and deflection of the thrust roller upon the occurrence of a longitudinal thrust overload.

2. An overload-responsive thrust mechanism as claimed in claim 1, including means for presetting the resilient means to the thrust load to be normally resisted without deflection.

3. An overload-responsive thrust mechanism for a rotatable member subject to longitudinal thrust loads and thrust overloads, comprising a thrust roller mounted adjacent the rotatable member, the rotatable member having a thrust bearing surface on which the thrust roller rolls when the rotatable member is rotated, means for mounting the thrust roller including a support pivoted at one end and extending generally parallel to the axis of rotation of the rotatable member, resilient means at the other end of the support for holding the other end of the support and roller in their normal positions without deflection under the normal thrust load of the rotatable member, and means responsive to an abnormal longitudinal thrust load and the resulting deflection of the support for manifesting the existence of the abnormal thrust load on the thrust roller.

4. An overload-responsive thrust mechanism as claimed in claim 3, including means for setting the resistance imposed by the resilient means.

5. A mechanism as claimed in claim 3, in which the responsive means comprises electric signal means actuated by movement of said other end of the support in response to a thrust overload.

6. An overload-responsive thrust mechanism for a rotatable member subject to longitudinal thrust loads and thrust overloads, comprising a thrust roller mounted adjacent the rotatable member, the rotatable member having a thrust bearing surface on which the thrust roller rolls when the rotatable member is rotated, means for mounting the thrust roller including a bridge extending lengthwise of the rotatable member and pivotally supported at its end on the side of the roller opposite the thrust bearing surface, and resilient means at the other end of the bridge for supporting the other end of the bridge and roller in its normal position without deflection under the normal thrust load of the rotatable member, said thrust bearing surface and the engaging surface of the roller being parallel to each other at the point of contact and at an angle to the axis of the rotatable member to provide a thrust load component in the direction toward the bridge, said resilient means being adapted to permit pivoting of the bridge and deflection of the thrust roller and to thereby provide give in the thrust mechanism upon the occurrence of a thrust overload.

7. In an apparatus of the type of rotary kilns, rotary mills and rotary driers, including an inclined rotatable chamber having a tire on its periphery and a thrust roller engaging the down slope side of the tire for countering the longitudinal thrust of the rotatable chamber, means for supporting the thrust roller for rotation on an axis at substantially right angles to the axis of the rotatable chamber, said supporting means comprising a bridge extending substantially parallel to the axis of the rotatable chamber, means for pivotally supporting the down slope end of the bridge, and means for resiliently supporting the other end of the bridge in its normal position without deflection under the normal thrust load of the rotatable chamber, said thrust roller being mounted intermediate the ends of the bridge and the means for resiliently supporting said other end of the bridge being adapted to permit pivoting of the bridge and deflection of the thrust roller upon the occurrence of a thrust overload applied by the rotatable chamber to the thrust roller.

8. In an apparatus of the type of rotary kilns, rotary mills and rotary driers, including an inclined rotatable chamber having a tire on its periphery and a thrust roller engaging the down slope side of the tire for countering the longitudinal thrust of the rotatable chamber, means for supporting the thrust roller for rotation on an axis at substantially right angles to the axis of the rotatable chamber, said supporting means comprising a bridge extending substantially parallel to the axis of the rotatable chamber, means for pivotally supporting the down slope end of the bridge, means for resiliently supporting the other end of the bridge in its normal position without deflection under the normal thrust load of the rotatable chamber, means for setting the resilient supporting means to counterbalance the normal thrust load of the rotatable chamber, said thrust roller being mounted intermediate the ends of the bridge and the means for resiliently supporting said other end of the bridge being adapted to permit pivoting of the bridge and deflection of the thrust roller upon the occurrence of a thrust overload applied by the rotatable chamber to the thrust roller, and signal means responsive to the pivoting of the bridge upon the occurrence of a thrust overload for manifesting the occurrence of the thrust overload.

9. In an apparatus of the type of rotary kilns, rotary mills and rotary driers, including an inclined rotatable chamber having a tire on its periphery and a thrust roller engaging the down slope side of the tire for countering the longitudinal thrust of the rotatable chamber, the tire having a beveled side surface and the thrust roller having a cooperating beveled peripheral surface, means for supporting the thrust roller for rotation on an axis at substantially right angles to the axis of the rotatable chamber, said supporting means comprising a bridge extending substantially parallel to the axis of the rotatable chamber, means for pivotally supporting the down slope end of the bridge, means for resiliently supporting the other end of the bridge in its normal position without deflection under the normal thrust load of the rotatable chamber, said thrust roller being mounted intermediate the ends of the bridge, means for adjusting the tilt of the bridge for in turn setting the peripheral surface of the roller parallel to the beveled surface of the tire at the point of contact, the means for resiliently supporting said other end of the bridge being adapted to permit pivoting of the bridge and deflection of the thrust roller upon the occurrence of a thrust overload applied by the rotatable chamber to the thrust roller, and signal means responsive to the pivoting of the bridge for manifesting the occurrence of a thrust overload on the thrust roller.

10. In an apparatus including a rotatable member subject to thrust loads and thrust overloads, an annular thrust bearing on the rotatable member having thrust bearing surfaces on its opposite sides, a thrust roller mounted on each side of the thrust bearing having a normal axis of rotation generally at right angles to the axis of rotation of the rotatable member and a peripheral bearing surface engaging the adjacent bearing surface of the thrust bearing on the rotatable member, and a mounting means for each of the thrust rollers, the improvement in which the mounting means for each of the thrust rollers supports its thrust roller in its normal position under the normal thrust load of the rotatable member and includes yieldable means responsive to a thrust overload permitting deflection of the thrust roller for avoiding damage to the apparatus as the result of a thrust overload.

11. An apparatus as claimed in claim 10, in which the bearing surfaces of the thrust bearing converge outwardly and the thrust rollers have complementary peripheral bearing surfaces, whereby a force component directed toward the mounting means is produced by a thrust overload for actuating the yieldable means.

12. In an apparatus of the type of rotary kilns, rotary mills and rotary driers, including an inclined rotatable chamber having a tire on its periphery and a thrust roller on the down slope side of the tire for countering the thrust of the rotatable chamber, the side of the tire and the periphery of the thrust roller having complementary engaging bearing surfaces, and means for supporting the thrust roller for rotation on an axis normally at right angles to the axis of the rotatable chamber, the improvement in which said supporting means comprises a bridge normally extending parallel to the axis of the rotatable chamber, said thrust roller being mounted for rotation intermediate the ends of the bridge, means for pivotally supporting one end of the bridge, and means for resiliently supporting the other end of the bridge in its normal position against deflection under the normal thrust load of the rotatable chamber, the means for resiliently supporting said other end of the bridge permitting pivoting of the bridge upon the occurrence of a thrust overload applied by the rotatable chamber to the thrust roller, whereby the pivoting of the bridge manifests the existence of a thrust overload on the thrust roller.

References Cited in the file of this patent

UNITED STATES PATENTS

| | | |
|---|---|---|
| 760,941 | Wilson | May 24, 1904 |
| 2,072,219 | Robison | Mar. 2, 1937 |
| 2,310,473 | Svendsen | Feb. 9, 1943 |
| 2,644,546 | Doolan | July 7, 1953 |
| 2,663,861 | Heath | Dec. 22, 1953 |
| 2,842,633 | Roach | July 8, 1958 |